United States Patent
Gillot et al.

(10) Patent No.: US 11,591,981 B2
(45) Date of Patent: Feb. 28, 2023

(54) SYSTEM AND METHOD FOR DETECTING MALFUNCTIONING TURBO-DIESEL CYLINDERS

(71) Applicant: DAF Trucks N.V., Eindhoven (NL)

(72) Inventors: Jan Gillot, Heeze (NL); John De Graaf, Eindhoven (NL)

(73) Assignee: DAF Trucks N.V., Eindhoven (NL)

( * ) Notice: Subject to any disclaimer, the term of this patent is extended or adjusted under 35 U.S.C. 154(b) by 0 days.

(21) Appl. No.: 16/761,064

(22) PCT Filed: Nov. 2, 2018

(86) PCT No.: PCT/NL2018/050731
§ 371 (c)(1),
(2) Date: May 1, 2020

(87) PCT Pub. No.: WO2019/088839
PCT Pub. Date: May 9, 2019

(65) Prior Publication Data
US 2021/0239064 A1    Aug. 5, 2021

(30) Foreign Application Priority Data
Nov. 3, 2017  (NL) .................................. 2019853

(51) Int. Cl.
*F02D 41/22* (2006.01)
*F02D 41/00* (2006.01)
(Continued)

(52) U.S. Cl.
CPC ........... *F02D 41/22* (2013.01); *F02D 41/009* (2013.01); *G01B 21/22* (2013.01); *G01L 9/12* (2013.01);
(Continued)

(58) Field of Classification Search
CPC .................. F02D 41/22; F02D 41/009; F02D 2200/0614; F02D 2200/101; F02D 2200/1015; G01M 15/11
See application file for complete search history.

(56) References Cited

U.S. PATENT DOCUMENTS 4,117,813 A * 10/1978 Yamashita ............... F02M 7/17
                                                    123/334
4,782,692 A * 11/1988 Peden ................... G01M 15/06
                                                    73/114.25
(Continued)

FOREIGN PATENT DOCUMENTS

DE   102009035700 B3   6/2011
DE   102016104052 A1   9/2016
(Continued)

OTHER PUBLICATIONS

Feb. 25, 2019, International Search Report and Written Opinion, PCT/NL2018/050731.
(Continued)

*Primary Examiner* — Logan M Kraft
*Assistant Examiner* — Joshua Campbell
(74) *Attorney, Agent, or Firm* — Banner & Witcoff, Ltd.

(57) ABSTRACT

According to the invention, a diagnostic system is provided for diagnosing a misfire condition is provided of individual engine cylinders in a turbocharged diesel engine having at least a first and a second cylinder associated with a common exhaust path. The system comprises a pressure sensor in an exhaust path, for measuring a pressure value; a crankshaft position sensor, for detecting a rotational crankshaft position; and a processor unit for reading the pressure sensor and the crankshaft position sensor. The processor unit is arranged for performing acts of: sampling pressure values of the pressure sensor in the common exhaust path as a function of crankshaft angle position; attributing for each cylinder (Continued)

fired in succession at least two sampling values ($P_\alpha$, $P_\beta$) for at least two successive crankshaft angle positions of a pressure pulse during a cylinder firing operation; determining a boundary for a coordinate ($P_\alpha$, $P_\beta$) formed by a tuple of sampling values ($P_\alpha$, $P_\beta$); diagnosing a misfire condition if the coordinate formed by said tuple of sampling values is outside the boundary.

17 Claims, 7 Drawing Sheets

(51) Int. Cl.
  *G01B 21/22* (2006.01)
  *G01L 9/12* (2006.01)
  *G01M 15/05* (2006.01)
(52) U.S. Cl.
  CPC ..... *G01M 15/05* (2013.01); *F02D 2200/0614* (2013.01); *F02D 2200/101* (2013.01); *F02D 2200/1015* (2013.01)

(56) References Cited

U.S. PATENT DOCUMENTS

| | | | | |
|---|---|---|---|---|
| 5,109,825 | A * | 5/1992 | Joos | G01M 15/11 123/479 |
| 5,576,963 | A * | 11/1996 | Ribbens | G01M 15/11 123/436 |
| 5,717,133 | A * | 2/1998 | Wu | G01M 15/11 123/436 |
| 6,202,415 | B1 * | 3/2001 | Lohmann | F02D 23/00 701/111 |
| 6,243,641 | B1 * | 6/2001 | Andrews | F02D 41/1448 123/436 |
| 7,909,018 | B2 | 3/2011 | Ishiguro et al. | |
| 8,061,136 | B2 * | 11/2011 | Delp | F02D 13/0261 123/347 |
| 2006/0207526 | A1 * | 9/2006 | Kassner | F02P 5/1514 123/1 R |
| 2013/0283782 | A1 | 10/2013 | McConville et al. | |
| 2016/0265452 | A1 | 9/2016 | Martin et al. | |
| 2017/0101956 | A1 | 4/2017 | Younkins et al. | |

FOREIGN PATENT DOCUMENTS

| | | |
|---|---|---|
| DE | 102015221447 A1 | 5/2017 |
| EP | 3333394 A1 | 6/2018 |
| WO | 9004093 A1 | 4/1990 |
| WO | 9944028 A1 | 9/1999 |

OTHER PUBLICATIONS

Feb. 3, 2020, International Preliminary Report on Patentability, PCT/NL2018/050731.

* cited by examiner

SYSTEM AND METHOD FOR DETECTING MALFUNCTIONING TURBO-DIESEL CYLINDERS

CROSS-REFERENCE TO RELATED APPLICATIONS

This application is a U.S. National Stage application under 35 U.S.C. § 371 of International Application PCT/NL2018/050731 (published as WO 2019/088839 A1), filed Nov. 2, 2018, which claims the benefit of priority to Application NL 2019853, filed Nov. 3, 2017. Benefit of the filing date of these prior applications is hereby claimed. Each of these prior applications is hereby incorporated by reference in its entirety.

The invention relates to a diagnostic system and method for identifying malfunctioning cylinders in a turbo-diesel engine and the detection of cylinder misfiring. More in particular the invention relates to misfire detection in multi-cylinder turbocharged diesel engine-systems.

Cylinder malfunction in diesel engines is a known cause of reduced engine performance and further results in pollutant exhaust emissions. Cylinder malfunction is understood to include misfiring, incomplete or defective combustion, inoperative cylinders, or other cylinder related problems or disturbances having a permanent character, such as fuel injector defects. Cylinder misfiring in particular has been understood to be a mayor contributor to increased pollutant emissions in diesel engine systems, such as turbo-diesel engines, and is known to have a potentially damaging effect on emission control devices. The occurrence of incomplete combustion and misfiring are causes of cylinder malfunction. Throughout the specification, a 'firing operation' includes operation steps of an engine that results in either a fire or misfire condition. Causes of malfunction may originate from a compromised physical integrity of the cylinder head or cylinder block, and more commonly include damage to the injector element of the cylinder. Complex hydrocarbons, carbon monoxide and other products of incomplete combustion will then be excessively introduced into the exhaust gas. The presence of the latter products in the exhaust gas often only detectable using specialized equipment. A malfunctioning cylinder may therefor go undetected for any extended period of time, thereby increasing the risk of further detriment of the physical integrity of such a cylinder. Further detriment of physical integrity of a cylinder is known to give rise to closely spaced intermittent misfiring, which is in particular known to cause excessive amounts of unburnt fuel to reach the engine emission control devices giving rise to local exothermic reactions. Exothermic reactions in the emission control devices can often have damaging or destructive results. Pollutant emissions from unburnt diesel fuel are further also known to be harmful to the environment and are health-detrimental. Such emissions may also include fuel additives and known carcinogenic compounds. Among the whole of incomplete combustion occurrences, misfiring is here understood as the substantially entirely incomplete combustion or the lack of combustion of injected fuel into a cylinder. It can be understood that some level of incomplete combustion is unavoidable in current internal combustion engines, even under normal operating conditions. Signs of unavoidable incomplete combustion and signs of a malfunctioning cylinder can be very similar in the early stage of the malfunction. Misfiring may more commonly occur when exhaust gas is recirculated to the inlet of an engine. Detection of misfiring may, in the latter situation, not be indicative of a malfunctioning cylinder. Unavoidable incomplete combustion therefore poses an obstacle for the accurate detection of any more serious form of incomplete combustion, namely that indicative of a malfunctioning cylinder. Many symptoms of a defective cylinder remain virtually undetectable to a vehicle driver until the engine performance is noticeably altered. Such a problem is therefor currently often detected only during routine workshop inspection. The detection of a malfunctioning cylinder during such an inspection can be untimely with regard to preventing the progression of damage. One known method of identifying a defective cylinder is a diesel engine injector diagnostic based on engine speed deceleration. The cylinder is taken as the collective term for all elements involved in working to inject, combust and draw power from fuel in a cylinder combustion chamber. Diesel engine injector diagnostics requires the physical inspection of the cylinder in a workshop and includes running the diesel engine stationary or at idle. However, even in routine workshop inspection the reduced performance of a malfunctioning cylinder is easily overlooked since a misfire may not occur under the operating conditions possible in a workshop setting. Malfunctioning cylinders may only suffer a slightly higher incidence of incomplete combustion without clearly showing an incidence of misfiring. Such malfunctioning cylinders can therefor also go undetected in workshop inspections. At an early stage of a cylinder malfunction, a simple servicing measure is often sufficient to repair the cylinder. Failure to detect the cylinder malfunction in an early stage will as described cause any defect to be aggravated over time and greatly increase servicing costs, as well as increase the impact on public health and the environment.

As a result of more stringent legislation diesel powered vehicles are also required to have an on-board diagnostic and warning system to signal a vehicle driver of the occurrence of misfiring. Depending on the failure, the misfire can be continuous or intermittent, over multiple cylinders. Besides this, the misfire can be present only under specific engine speed & torque conditions. Additionally a need exists for determining early onset of cylinder malfunction even before misfiring would detectably occur in workshop settings.

For cylinder misfire detection in turbo-diesel engines a method is currently used in which the exhaust peak pressure is measured separately at each cylinder in the exhaust gas manifold in relation to the position of the crankshaft of the engine. Due to a necessary proximity of the pressure sensors to the cylinder exhaust valves, such separate pressure sensors are exposed to harsh operating conditions, such as high temperatures and corrosive exhaust gasses. Under these operating conditions pressure sensors are further susceptible to clogging by carbon deposits. The harsh working conditions also negatively effect the durability of the sensors and long term accuracy of measurement. In the conventional method a cylinder is determined to be misfiring when the exhaust gas pressure associated with an individual cylinder is found to remain below a threshold value during an expected combustion event. The use of threshold values for identifying a misfire is inaccurate when testing a cylinder under variable operating conditions, such as injected fuel quantity, air supply, inlet pressure and lubrication. This known system and method is described in U.S. Pat. No. 6,243,641. According to this method misfiring is determined based on a boundary value, when a cylinder during an expected moment of firing produces a pressure signal which is below the boundary level that cylinder is determined to have misfired. However, though cylinder misfire is a hazard of its own it does not necessarily imply that a cylinder is malfunctioning. Cylinder misfiring can be frequent but relatively harmless under certain conditions, in which for example insufficient air is supplied to the cylinder. In turbo-diesel engines this may simply be the result of excessive exhaust gas recirculation. Every cylinder will at some moment during its service experience unavoidable incomplete combustion, resulting in misfiring or lesser performance. Therefor incidental misfire detection alone is insufficient in determining a permanently defective or malfunctioning cylinder.

Problems with a malfunctioning cylinder can occur well in advance of symptomatic misfiring. Preemptive discovery of a malfunction could alert a vehicle driver well in advance that a cylinder malfunction is developing. The method described in U.S. Pat. No. 6,243,641 further compares the pressure behavior of a cylinder to a boundary value. When the pressure signal associated with a specific cylinder remains below a boundary value it is detected to be misfiring. This boundary level is particularly effective when comparing the pressure behavior of a cylinder under fixed operating conditions, such as in a workshop. However, when operating conditions are variable, approximations of cylinder behavior are required to determine the boundary value. Such a method is susceptible to misidentifying misfiring in performance regions inside, and even more so outside, of the confidence interval of the approximations. Misidentification of misfiring cylinders is bound to increase unnecessary workshop inspection and provide an unsatisfactory level of accurateness in identification of misfiring. The latter is often due to an error introduced by approximating cylinder behavior. Further, making valid approximations with regard to engine behavior requires extensive research into engine behavior under various loads, air pressure, cylinder temperature, humidity, exhaust gas recirculation percentage, injected fuel quantity and other variables. The use of complex models is expensive and highly complex, and due to its complexity more prone to failure. An on board system executing this method would, in such case, need a wide variety of engine sensors in order to use such a model. Furthermore, for new engines it is likely that a working model may become less accurate as the engine ages, this can even result in identifying normal engine behavior as misfiring. In consideration of the above a drive therefor exists towards a simplistic method for identifying cylinder misfire and malfunction.

Particularly in turbo-diesel engines the turbine introduces upstream disturbances in the pressure measurements. Measuring pressure for multiple cylinders in the exhaust path, in particular outside of the manifold, can under certain conditions result in recurring interference. Pressure signals of one cylinder may in such a situation be attributed to another cylinder. Interference is also known to affect the strength and in particular the signal to noise ratio of the signal.

Accordingly a need is felt to be able to identify and diagnose malfunctioning cylinders in a turbo-diesel engine using a method which eliminates unnecessary workshop inspections, is less-invasive than known methods for determining cylinder misfire and preferably uses already present standard pressure sensors in the exhaust so as to save on service costs. In particular the need is felt to diagnose malfunctioning cylinders in a turbo-diesel engine and to provide a method for using a pressure sensor associated with a variable geometry turbine. Further this includes the need for determining when a cylinder suffers from an elevated incidence of incomplete combustion and thus higher toxic emissions, even before misfiring would become otherwise workshop detectable.

Accordingly it is an object of the present invention to propose a method and system for comparing combustion behavior in order to identify malfunctioning cylinders, while on the road, through analyzing the combustion behavior thereof. In a more general sense it is thus an object of the invention to overcome or reduce at least one of the disadvantages of the prior art. It is also an object of the present invention to provide alternative solutions which are less cumbersome in assembly and operation and which moreover can be made relatively inexpensively. Alternatively it is an object of the invention to at least provide a useful alternative.

To this end the invention provides for a method and a system as defined in one or more of the appended claims.

Turbo-diesel engines are often equipped with a crankshaft position sensor. Turbo-diesel engines are also often already fitted with a pressure sensor in the exhaust e.g. in order to allow for controlled adjustment of a variable geometry turbine or VGT to steer pressure drop over the exhaust.

In case of cylinder misfiring or incomplete combustion, while on road, e.g. increased toxic exhaust gas emissions, a diagnostics routine will identify whether the misfiring concerns a malfunctioning cylinder or unavoidable incomplete combustion. When a single engine cylinder experiences misfiring that cylinder produces a reduced exhaust gas pressure signal, during its exhaust stroke, relative to that the other cylinders in the engine. According to the invention, a diagnostic system is provided for diagnosing a misfire condition of individual engine cylinders in a turbocharged diesel engine having at least a first and a second cylinder, the system comprising:

a pressure sensor for measuring a pressure value in an exhaust path of the at least first and second cylinder;

a crankshaft position sensor, for detecting a rotational crankshaft position; and a processor unit for reading the pressure sensor and the crankshaft position sensor;

wherein the processor unit is arranged for performing acts of:

sampling pressure values of the pressure sensor as a function of crankshaft angle position;

attributing for each cylinder fired in succession at least two sampling values ($P_\alpha$, $P_\beta$) for at least two successive crankshaft angle positions of a pressure pulse during a cylinder firing operation;

determining a boundary for a coordinate ($P_\alpha$, $P_\beta$) formed by a tuple of sampling values ($P_\alpha$, $P_\beta$);

diagnosing a misfire condition if the coordinate formed by said tuple of sampling values is outside the boundary.

The invention has as an advantage, that by this method a variety of pressure values can be measured, that can be diagnosed as misfire or correct firing, based on their relative position to the boundary formed by pressure value pairs or tuples, that are just allowed. The boundary may be a heuristically determined lower threshold that depends on the measured pressure value, instead of being a fixed one. This allows for scaling during load conditions, and can also be suitably adapted for crank speed, while keeping the boundary threshold unchanged.

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIG. 1 schematically shows a diagnostic system for identifying a malfunctioning engine cylinder in a turbo-diesel engine;

Figure 1:
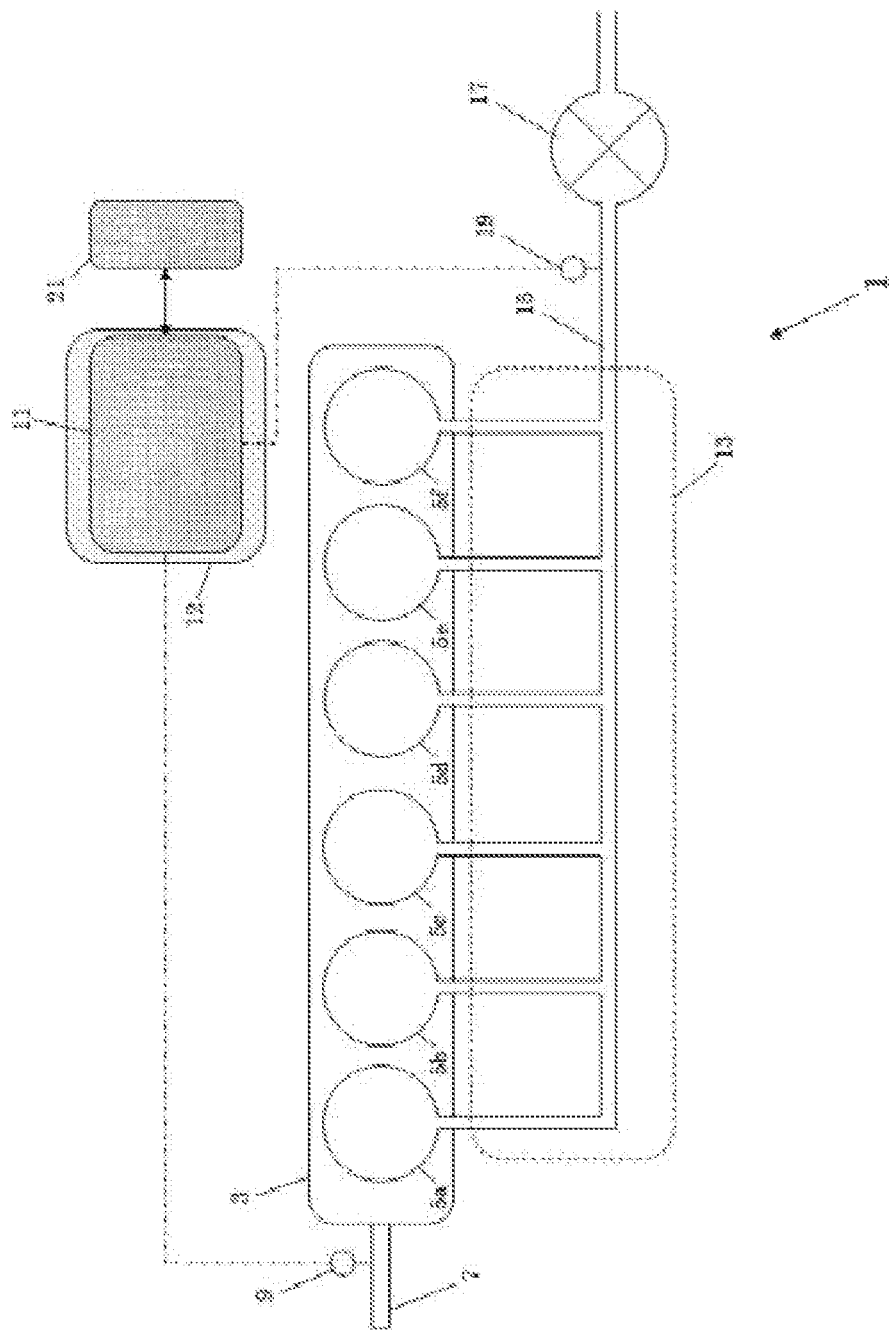
Figure 2A:
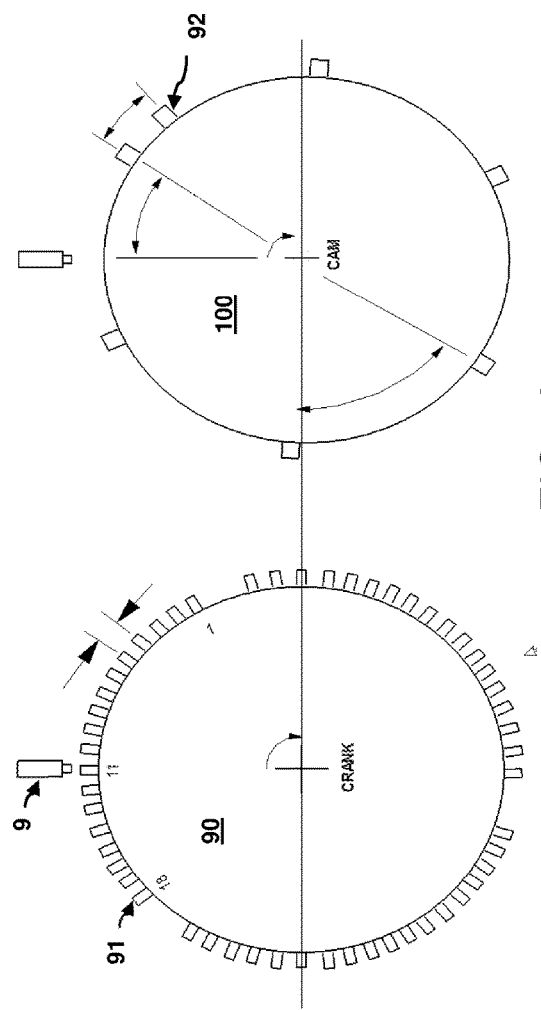
FIG. 2 (A and B) shows an embodiment of a crankshaft sensor.

In FIG. 1 a diagnostic system 1 for diagnosing engine cylinders in a turbocharged diesel engine or turbo-diesel engine 3 is schematically illustrated. In the diagnostic system 1 of FIG. 1 the turbo-diesel engine 3 includes six cylinders 5a,5b,5c,5d,5e,5f, a crankshaft 7 and a crankshaft position sensor 9. The crankshaft position sensor 9 is arranged for measuring the rotational crankshaft position and is further associated with a processor unit 11. The processor unit 11 is arranged to determine the crank-angle of each of the cylinders 5a,5b,5c,5d,5e,5f from a rotational crankshaft position. The system further comprises a common exhaust gas manifold 13 connected to a shared exhaust conduit 15, together defining a shared exhaust path for the cylinders 5a,5b,5c,5d,5e,5f. In the example, exhaust conduit 15 is connected to a variable geometry turbine or VGT 17 and is further provided with an absolute pressure sensor 19 provided in the exhaust path 15, that connects to cylinders 5a-5f. Preferably the pressure is closest by the cylinder exhausts to optimize the pressure pulse sampling. In the example, the pressure sensor is closer to the last cylinder, but also configurations are feasible where the pressure sensor is provided at mid position or for each individual cylinder. Preferably, the sensor is away from further downstream elements such as a turbine or exhaust gas recirculation cooler and circuit. The sensor is robust and heat and pollutant proof, e.g. a ceramic capacitive sensor or any suitable type, such as a piezoelectric with a pressure signal represented as a voltage. Pressure sensor 19 is communicatively connected to processor unit 11. The pressure may be a gauge pressure, relative to atmospheric pressure, or a differential pressure, relative to e.g. pre-turbine and boost pressure, post turbine or the like. Using crank position information, the pressure signal in voltage is converted to digital signal using an analog to digital converter e.g. on a 30 degrees crank angle interval. In FIG. 2a it is shown that a crank shaft detector comprises a 'toothed' wheel, revolving with the crank shaft. The toothed wheel can in practice have other marks than teeth, such as slots etc. The teeth passing the crank speed sensor can be used as a trigger to execute the AD conversion, this can be specified e.g. per 6 degrees crank angle, which amounts to 5 tooth pulses. A sample position between teeth can be achieved with interpolation of the location between teeth.

The processor unit 11 may be part of an electronic control unit or engine control unit or ECU 12 which is arranged for on-board diagnostics. The processor unit 11 is arranged for receiving and storing pressure data from the pressure sensor 19 and crank-angle data from the crankshaft position sensor 9. As is common in four-stroke engines, two crankshaft revolutions are necessary for each cylinder to perform a full four-stroke cycle. A four stroke engine has the following four strokes:

Intake: Piston moves down and inlet valve is opened to let the compressed air in the cylinder Compression stroke: Inlet valve is closed and piston moves up to compress the charged air even further. This compression also increases temperature of the air.

Combustion stroke: Around Top Dead Center, fuel is injected, which start to auto-ignite due to the temperature. This increases the pressure even more. The fuel injection continues while the piston moves down.

Exhaust stroke: the exhaust valve open and the piston moves up, releasing the air into the exhaust.

The opening of the valves starts before Bottom Dead Center, while in the combustion stroke, and remains open until just before Top dead Center, while in the exhaust stroke.

After a successful combustion, the pressure in the combustion chamber is high relative to the exhaust pressure. The combusted gasses will flow through the exhaust port when the exhaust valve is opened. This will cause an initial pressure pulse traveling through the exhaust manifold. A second pressure pulse may occur when the piston moves up.

A crank-angle of each individual cylinder 5a,5b,5c,5d,5e, 5f can be predetermined by the engine construction. The processor unit 11 is arranged to determine a momentary pressure signal for each of the cylinder 5a,5b,5c,5d,5e,5f at their respective moment of arriving at a combustion-related-crank-angle within a single four-stroke cycle of all cylinders. In the embodiment, the processor unit is arranged for performing acts of:

sampling pressure values of the pressure sensor in the common exhaust path as a function of crankshaft angle position; and attributing for each cylinder fired in succession at least two sampling values ($P_\alpha$, $P_\beta$) for at least two successive crankshaft angle positions of a pressure pulse during a cylinder firing operation.

As will be explained further below it is then determined whether a misfire condition exists.

Figure 2B:
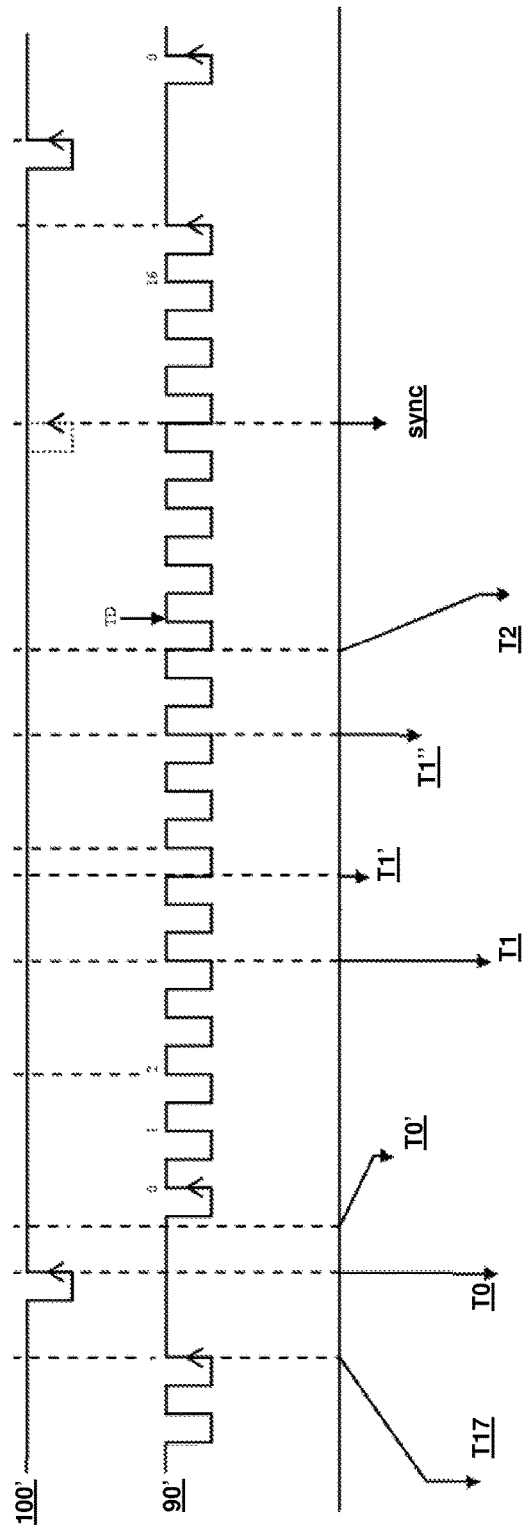

FIG. 2 shows an embodiment of a crankshaft sensor 9, that detects an angular position of the crankshaft, by a flywheel 90 having detector markings 91 spaced at regular angles, wherein the passing of a marking is associated with passing of a crankshaft angle. In more detail, an example of a crankshaft position sensor 9 is shown for a six cylinder configuration. The flywheel of the engine has slots machined at 6 degree intervals around its periphery. The teeth on the crankshaft wheel 90 may be sensed by a variable reluctance sensor 9 or any suitable alternative (inductive, magnetic, optic, etc.) which is decoded by hardware to provide a pulse train where a rising edge may indicates the centre of the tooth/slot. The decoded signal provides coarse but accurate position information which is used for engine speed measurement and fuel pulse scheduling. Three pairs of "slots" are not machined, which is used to determine the position of the cylinder.

The cam shaft 100 has six equi-spaced teeth 91, associated with a specific cylinder of the engine. The teeth on the camshaft wheel may be sensed by an inductive or variable reluctance sensor 9 or any suitable alternative (magnetic, optic, etc.) which is decoded by hardware to provide a pulse train where a thresgold, rising edge or zero crossing or other method may indicates the center of the tooth or slot. Alternatively, the flywheel is provided with holes that, when they pass the sensor, cause a change in voltage (spike). As shown in the figure, there are 18 tooth+2 missing tooth per cylinder at 6 degrees crank angle interval (center to center), which covers 120 degrees crank angle segment. With the missing tooth, the piston position is known, for example: 13 teeth after the missing teeth passed the sensor, 2 pistons will be in Top Dead Center (TDC) position. Then, the only missing information is which cylinder pair is at TDC. For this, the cam shaft is also equipped with a 7th teeth (slot) and a inductance sensor. The cam shaft rotates with half the speed of the crank shaft. The passing of 6 of the teeth of the cam shaft coincide with passing of the missing teeth of crank shaft. With this, synchronization can be checked. The seventh teeth 92 is positioned for example about 15 degrees before the cam shaft teeth of cylinder one. When this seventh tooth is passing the sensor (sync), the next cylinder ready to fire is cylinder 1. The start of a cycle is indicated by as T0, which can be derived from the cam shaft tooth signal 100' or as failsafe, the start T0' of the 17 pulse train. The crankshaft position is used to determine the injection trigger signals: T1, T1' (logical start) T1" and end T2 (finish), scheduled around the cylinders Top Dead center.

Information from the sensor position can be converted to engine speed for example by measuring the Time T17 for 17 pulse events. Base principle:

$$\text{engine speed} = \frac{6/360}{\text{time between two succeeding teeth}} [\text{min}^{-1}]$$

In the engine control unit 11, the pressure voltage signal may be filtered using an analog resistance capacitor filter e.g. with a cut off frequency of 400 Hz. This is to remove high frequency noise from the signal. To see this in perspective, the combustion pulses occur three times per revolution and the maximum engine speed is 2200 rpm. To get frequency information of the combustion pulses, the cut off frequency is preferably above 2200/60×3=110 [Hz]. Note that in the non limiting example there are three combustions per revolution in a six cylinder four-stroke engine.

Figure 3:
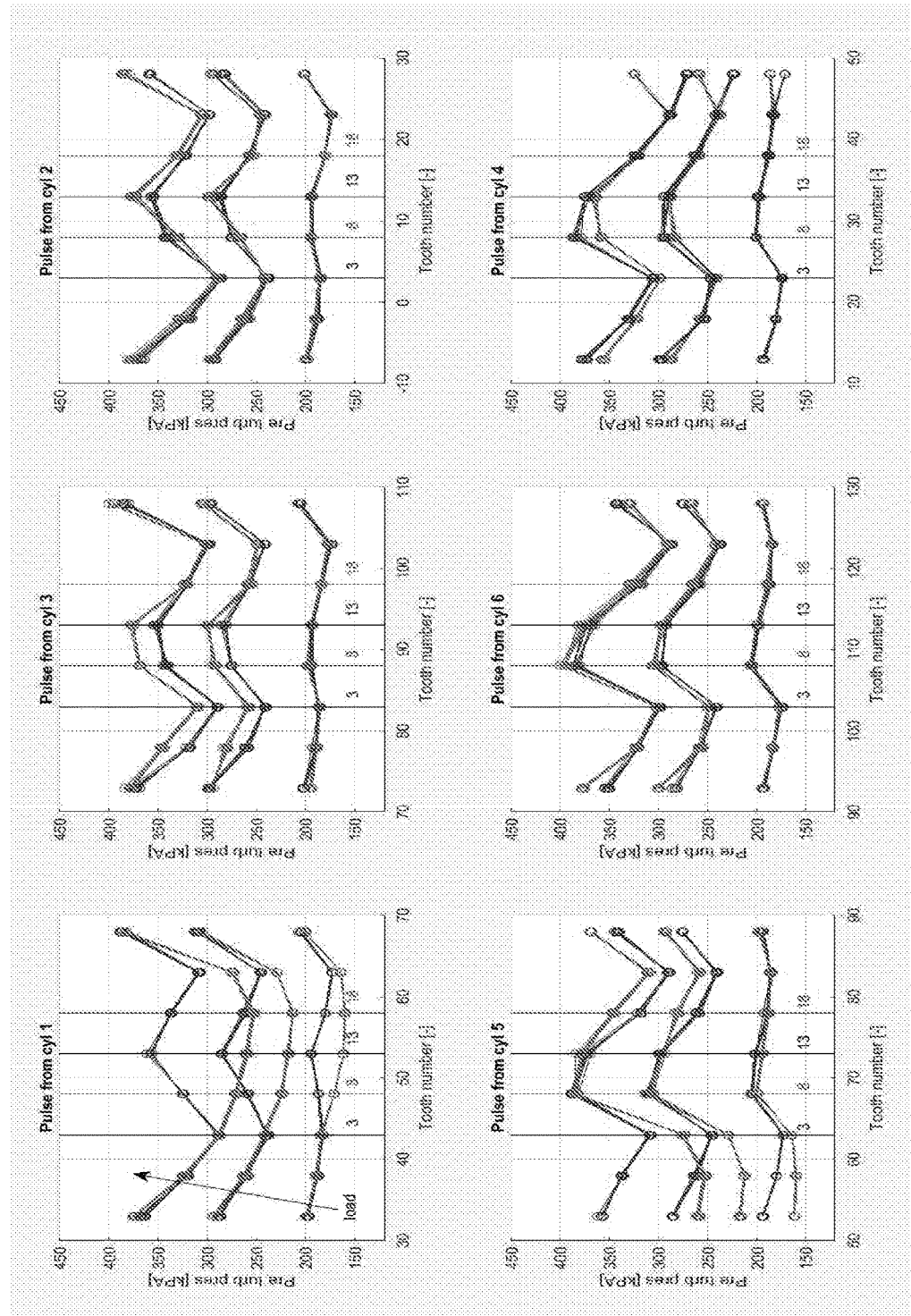
FIG. 3 shows increasing load conditions for the cylinders.
Figure 4:
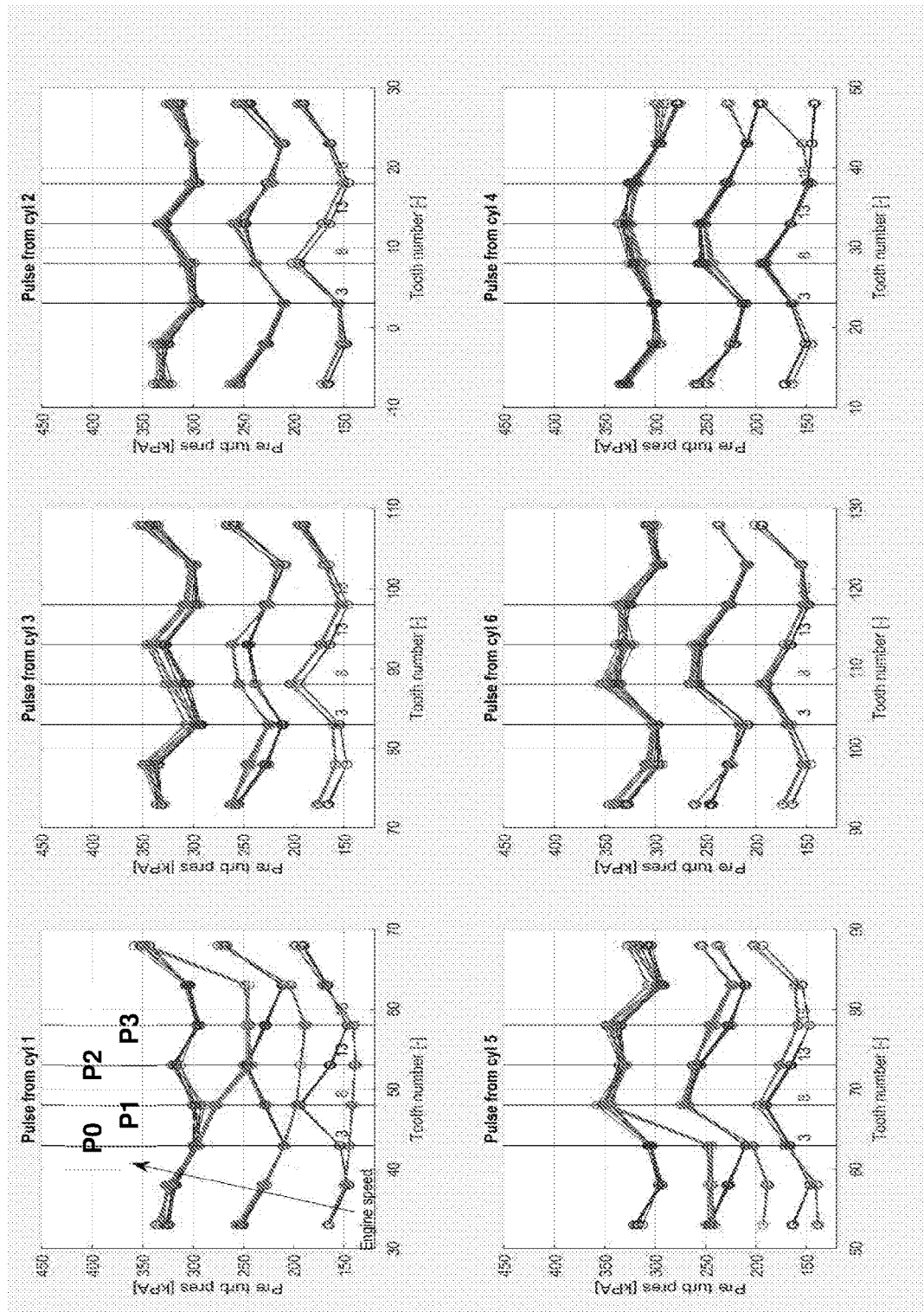
FIG. 4 shows exhaust pressure samples during steady state but with varying engine speed.

FIGS. 3 and 4 give exemplary sample graphs of a pressure pulse sampled as a function of crankshaft angle position, derived from the tooth pulses. The angle position is measured according to four crankshaft angle positions; starting on a sector of the flywheel depending on the firing cylinder. The crankshaft angle positions are measured with a toothed flywheel as described hereabove.

FIG. 3 shows increasing load conditions for the cylinders, illustrated by rising pressure values, for loads amounting to 50, 150 and 235 [mg] fueling. The engine speed is kept at 1400 rpm. Pressure samples are shown for each cylinder, for baseline and misfire on cylinder 1 at a constant engine speed, but with varying loads. For the different cylinders, there is a difference in magnitude and timing the pulses. This can be explained due to exhaust manifold geometry and distance to the sensor. In the example, the sensor was located in between the cylinder 4 and 5. The pulse from cylinder 4,5 and 6 will therefore reach the sensor faster and will also have a higher magnitude than the exhaust pulses from the cylinder 1,2 and 3. When changing the load condition by increased fueling, there is a change in magnitude of the exhaust pressure but the pattern remains the same. Note that in this figure, the change in magnitude is not only due to fueling, but also due to a changing set point of the exhaust pressure control.

In FIG. 4, exhaust pressure samples are shown during steady state but with varying engine speed. It shows that with increasing engine speed, the maximum pressure is sampled at a later crank angle. This is best seen at cylinder 1,2 and 3, which also have the longest distance from the sensor. On cylinder 5 and 6, at high engine speeds, a double pulse is seen. This can be due to pulse reflection or due a second pulse event: a first pulse event occurs when the exhaust valve is opening, a second pulse event occurs when the piston moves up, thereby pressing the remaining air out of the cylinder.

Accordingly, it is found that when the load increases, the amplitude and width of the pulse increases; and that when the engine speed increases, the pressure peak occurs at a later sample, which is due to the crank angle based sampling.

Figure 5:
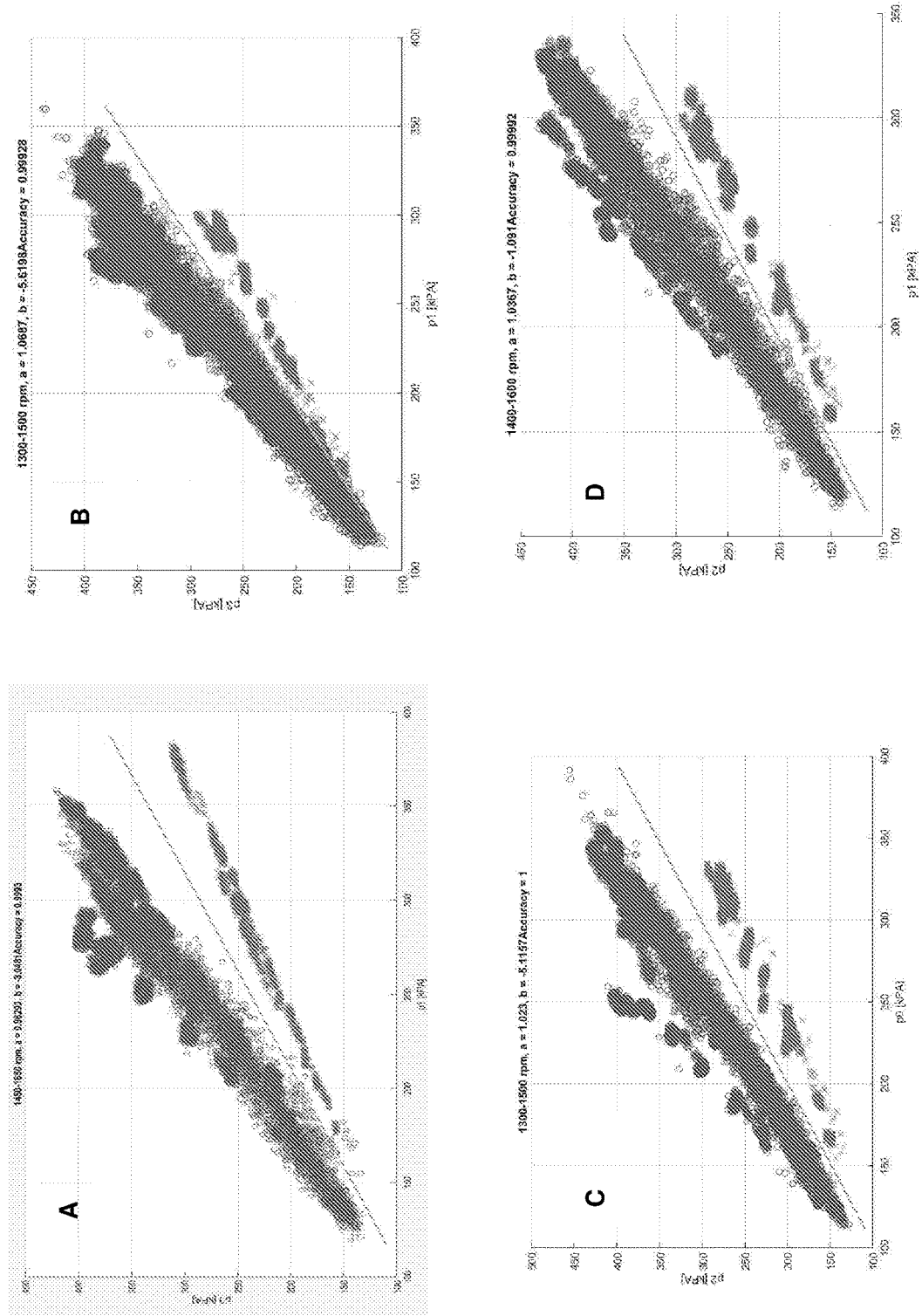
FIG. 5 (A-D) shows a data set for successful and incorrect firings.

FIG. 5 shows a number of exemplary data sets wherein for each cylinder fired in succession at least two sampling values ($P_0$, $P_B$) are attributed for at least two successive crankshaft angle positions of a pressure pulse during a cylinder firing operation. For example, in FIG. 5A a data set of pressure sample tuples P1, P3 is plotted, for pressure values obtained in a range of 1450-1650 rpm crankspeed. In FIG. 5B, a data set of pressure sample tuples P1, P3 is plotted, for pressure values obtained in a range of 1300-1500 rpm crankspeed. The speed ranges are distinguished by slightly different linear coordinates, for a piece wise linear boundary over a varying crankshaft speed.

In FIG. 5C, a data set of pressure sample tuples P0, P2 is plotted, for pressure values obtained in a range of 1300-1500 rpm crankspeed. In FIG. 5D, a data set of pressure sample tuples P1 P2 is plotted, for pressure values obtained in a range of 1400-1600 rpm crankspeed.

It is found that a boundary exists for coordinates ($P_\alpha$, $P_\beta$) formed by a tuple of sampling values ($P_\alpha$, $P_\beta$), that can be used for diagnosing a misfire condition if the coordinate formed by said tuple of sampling values is outside the boundary. In the figure, the boundary is formed by a linear borderline, dividing misfiring tuples from successful tuples. In this example the borderline is determined by tuples of first and second sampling values that satisfy a linear relationship, wherein a coordinate is outside the boundary for coordinates ($P_\alpha$, $P_\beta$) wherein Py<a(Px)+b, for a and b are constants. The borderline, or in this case more specifically, the linear constants can be determined by calibration techniques, such as, logistic regression or a "maximum margin classifier" such as Support Vector Machines or by hand based on a calibration set. In certain cases another boundary may be used than a linear boundary, e.g. depending on engine specifics such as load etc. A boundary can thus be qualified as a mathematical function that separates successful firing tuples from non successful tuples based on a calibration data set. The mathematical function can also be heuristically determined and/or may be characterized by (piece wise) linear constants over a specified engine speed and load interval.

In this specific embodiment two pressure samples $P_\alpha$, $P_\beta$ are used, where the first (Pα=first sample) before the exhaust pulse reaches the sensor after opening of exhaust valve and the third sample at the peak of the pulse (Pß=third sample). Thus, the second pressure sample at the second crankshaft position is in this case omitted, but this can vary depending on certain engine conditions as will be explained below. For example the at least two subsequent sampling values for at least two successive crankshaft angle positions can be selected as a function of cylinder position, relative to the pressure sensor. The engine speed was kept in the interval 1450-1650 rpm for a large data set containing:

Steady state engine speed and load with and without misfire;

Transient drive cycles with and without misfire;

From the figure, it appears that a linear classification can be used to accurately determine misfires, irrespective of load and transient cycles. The coefficients of the linear fit (Pß=a*Pα+b) and the pressure samples are dependent on cylinder and engine speed. The evaluation for misfire is as follows:

Misfire when:

pressure sample 2<a×pressure sample 1+b

In a simplified case when we would look for a pressure increase compared to the first sample, the coefficient would be a=1, b=0.

Figure 6:
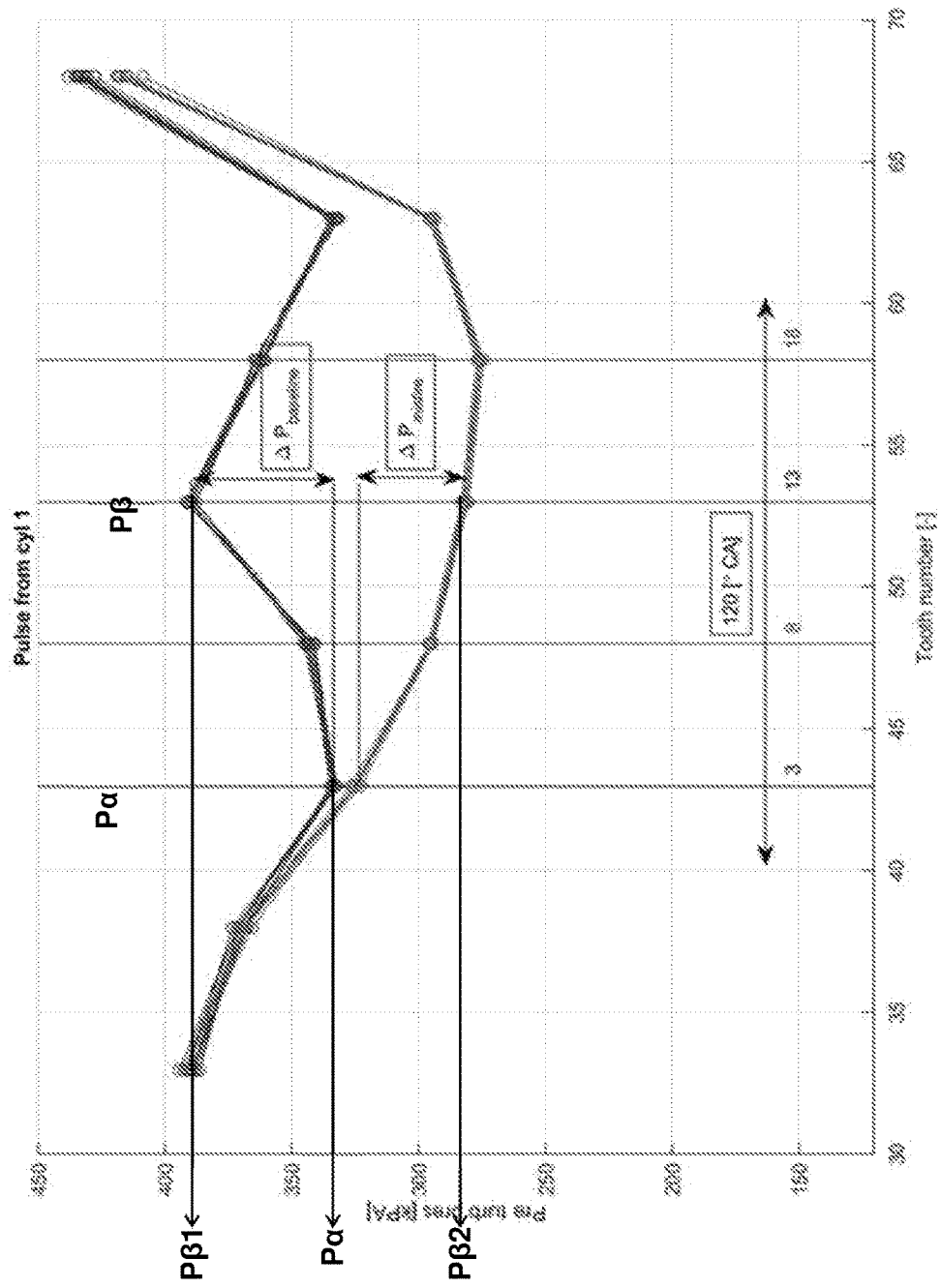
FIG. 6 shows a further example of a pressure pulse.

FIG. 6 shows a further example of a pressure pulse, wherein more than two sample values, e.g. 4 or 5 values can be used for sampling the pressure pulse. In case of a higher sample rate, for example per 6 deg crank angle, there will be more samples to choose from. In some instances, e.g. depending on engine speed, the samples in the range from 1) just before exhaust valve opening and 2) just before exhaust valve opening of the next firing cylinder can be used for evaluation of misfire.

Using more than two samples has the advantage, that the at least two sampling values for at least two successive crankshaft angle positions can be selected as a function of crankshaft speed, wherein, with increasing crankshaft speed, the sample value is shifted to an increased crankshaft angle position. This can be explained by that with increased engine speed, the samples are taken faster while the exhaust pulse travel time remains about the same. For instance, as shown in FIG. 4, for increasing speed, the sampling values apparently shift from crankshaft position. Thus, by sampling at various positions, an optimal tuple can be selected for diagnosing a misfire condition.

One could determine the calibration on a large data set, containing different use cases:

Steady state, transients, specific use case like dumping the clutch, rough road and so on.

Misfire types (random, single and paired cylinder misfire).

The fit can be determined:

for each cylinder, AND for every pressure sample pair, AND operating in a specific engine speed range.

From the data set, samples values α and ß were selected for load states and transient drive cycles wherein a Pα Pß yield indicative results. For example, for lower speeds, see FIG. 4, the samples P0, P2 (e.g. tooth 3 (α=0) and 13 (ß=2) yielded better flank discrimination than P1 (tooth 8-α=1), P3 (tooth 15; ß=3), and for lower speeds, due to the increased crank shaft speed, flanks of pressure samples P1 and P3 were better, for a sample set of 6 pressure values over a for a pressure pulse, associated with a revolution of about 30 degrees of the crank shaft. In the examples of FIGS. 3 and 4 two out of five samples can be chosen as Pα and Pß for α, ß a sample number. Classification may be subjected to machine learning techniques, wherein two pressure samples are classified for combustion as 1) misfire or 2) no misfire. Multiple algorithm may be used for classification, based on fitting a model to come to the right prediction. Examples of Algorithms are Logistic regression, Support Vector Machines (SVM), Decision tree, Random forest, Naive bayse.

Classification methods like SVM and logistic regression produce a boundary that can be linear or non-linear (quadratic, circular, or higher order). Higher order boundaries may result in better accuracy, but increase the risk of over fitting. For a calibration method data is gathered (exhaust pressure, engine speed, fueling, misfire yes/no, etc.) under various process conditions, e.g. steady state and transient, covering the complete engine speed load range. For this data an off-line classification is carried out, in a supervised learning phase, to find the coefficients for the boundary for each cylinder individually. Classification can be done on data covering a specific engine speed range (say 500-600, 600-700 [rpm], etc). This classification is carried out for every combination of sample pressures: e.g. the values (P0,P2), (P1,P3) (P2,P3) etc, For each cylinder 5 pressure samples are available, equally spaced on 30 [degrees Crank Angle]. Based on the supervised learning results, a boundary with the highest accuracy can be used for classification in the real-time evaluation. That is, pressure samples are not based on extrema, but selected pressure samples give the highest accuracy (best separation) over all possible conditions in the engine speed interval under consideration.

The classification will result in the following engine speed dependent, but constant in the interval parameters that are used in the real time evaluation, so that for each process conditions, a selected two (out of 5) pressure samples can be used in the evaluation with coefficients that determine the boundary for a fire (1) or misfire (2) condition.

Figure 7:
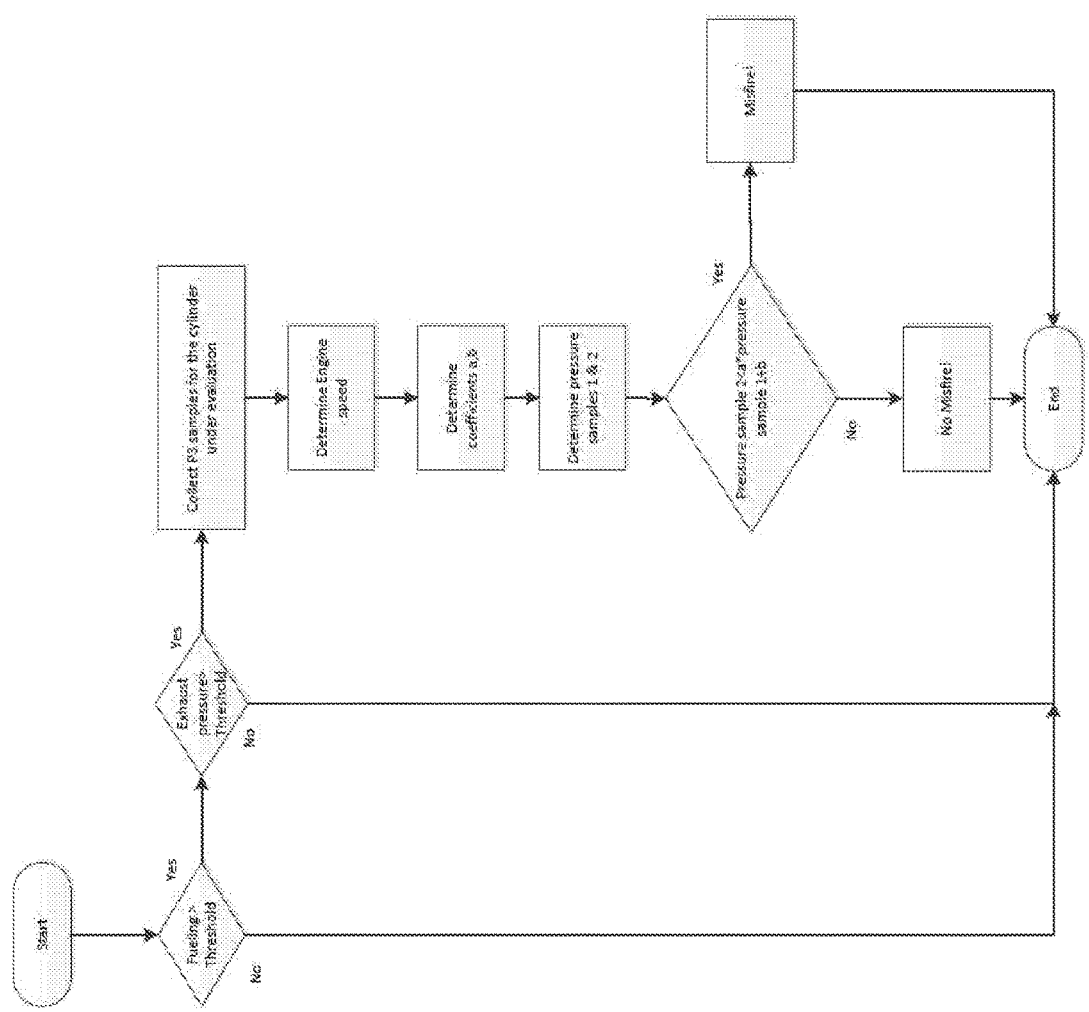
FIG. 7 shows a schematic diagnostic method.

FIG. 7 shows a schematic diagnostic method wherein an engine control unit is programmed, as follows. For example in a first step it is detected whether a fuel quantity that is provided to a cylinder is above a threshold. Thus, misfire detection can be made dependent on a load condition. In a further step, it is determined what exhaust pressure is, and the diagnosis is continued when exhaust pressure is above threshold. Next, a the engine speed is determined, in order to determine a boundary coefficient in this engine speed range for the specific cylinder under evaluation. Also, it is determine which two samples in this engine speed range for the specific cylinder are used for evaluation (e.g. which 2 out of 5 samples). Next, misfire is diagnosed by evaluating the sample pressures according to the boundary equation:

pressure sample 2<a×pressure sample 1+b

The above methods may be applied for certain load conditions or engine speeds; and may be combined with other methods.

For example in another strategy, a delta pressure is measured between subsequent samples, which may lead to a misfire diagnosis.

Or for example a linearized model may be provided with coefficients, depending on engine speed, load and start pressure; so that a sample pressure may be estimated. A delta pressure between the estimated pressure and the sample pressure may lead to a misfire diagnosis. Also in the calibration, various strategies can be applied in combination.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described while some of the embodiments described feature a fore stroke, six cylinder configuration, the invention may be especially applied in other arrangements including 3, 4, 5 or any other numbers of cylinders. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. A diagnostic system for diagnosing a misfire condition of individual engine cylinders in a turbocharged diesel engine having at least a first and a second cylinder, the system comprising:
   one or more pressure sensors for measuring a pressure value in an exhaust path of the at least first and second cylinder;
   a crankshaft position sensor, for detecting a rotational crankshaft position; and
   a processor unit for reading the pressure sensor and the crankshaft position sensor;
   wherein the processor unit is arranged for performing steps of:
   receiving pressure values of the pressure sensor as a function of crankshaft angle position;
   attributing for each cylinder fired in succession at least two sampling pressure values $P_\alpha$, $P_\beta$ for at least two successive crankshaft angle positions of a pressure pulse during a cylinder firing operation;
   determining a boundary for a coordinate $P_\alpha$, $P_\beta$ formed by a tuple of the at least two sampling pressure values $P_\alpha$, $P_\beta$, said boundary being a mathematical function of boundary pressure value coordinates Px, Py at said at least two successive crankshaft angle positions, said function having been determined to divide pressure values coordinates indicative of successful cylinder firing from those of cylinder misfiring;
   diagnosing a misfire condition if the coordinate formed by said tuple of the at least two sampling pressure values is outside the boundary.

2. The diagnostic system according to claim 1, wherein the pressure sensor is arranged in a common exhaust path of the at least first and second cylinders.

3. The diagnostic system according to claim 1, wherein the pressure sensor is a ceramic capacitive sensor.

4. The diagnostic system according to claim 1, wherein the crankshaft angle detector comprises a flywheel having detector markings spaced at regular angles, wherein the passing of a marking is associated with passing of a crankshaft angle.

5. The diagnostic system according to claim 1, further comprising a camshaft angle detector, wherein the camshaft angle position is combined with the crankshaft, to identify a firing cylinder.

6. The diagnostic system according to claim 1, further comprising a cut off filter, that removes high frequency components of the pressure sensor.

7. The diagnostic system according to claim 1, wherein the boundary is formed by tuples of first and second sampling values that satisfy a linear relationship, wherein a coordinate is outside the boundary for coordinates $P_\alpha$, $P_\beta$.

8. The diagnostic system according to claim 7, wherein $P_\beta < a*P_\alpha + b$, for a and b are constants over a specific engine speed interval.

9. The diagnostic system according to claim 1, wherein a first of said at least two sampling pressure values is taken before the pressure pulse reaches the pressure sensor after opening of a cylinder exhaust valve and a second of said at least two sampling pressure values is taken at a peak of the pulse.

10. A method for diagnosing a misfire condition of individual engine cylinders in a turbocharged diesel engine having at least a first and a second cylinder associated with a common exhaust path, comprising:
   sampling pressure values of a pressure sensor in the common exhaust path as a function of crankshaft angle position;
   attributing for each cylinder fired in succession at least two sampling pressure values for at least two successive crankshaft angle positions of a pressure pulse during a cylinder firing operation;
   determining a boundary for a coordinate $P_\alpha$, $P_\beta$ formed by a tuple of the at least two sampling pressure values $P_\alpha$, $P_\beta$, said boundary being a mathematical function of boundary pressure value coordinates Px, Py at said at least two successive crankshaft angle positions, said function having been determined to divide pressure value coordinates indicative of successful cylinder firing from those of cylinder misfiring;
   diagnosing a misfire condition if the coordinate formed by said tuple of the at least two sampling pressure values is outside the boundary.

11. The method according to claim 10, wherein the at least two sampling values for at least two successive crankshaft angle positions are selected as a function of crankshaft speed, wherein, with increasing crankshaft speed, the sample value is shifted to an increased crankshaft angle position.

12. The method according to claim 10 wherein the at least two subsequent sampling values for at least two successive crankshaft angle positions are selected as a function of engine load.

13. The method according to claim 10, wherein the at least two subsequent sampling values for at least two successive crankshaft angle positions are selected as a function of cylinder position, relative to the pressure sensor.

14. The method according to claim 10, wherein the boundary is provided from a calibration set.

15. The method according to claim 14, wherein the calibration set is provided in dependency of an injected fuel quantity, engine speed or engine load.

16. The method according to claim 10, wherein a pressure pulse is sampled for more than four subsequent pressure values over a crankshaft rotation of about 100-160 degrees.

17. The method according to claim 10, wherein a first of said at least two sampling pressure values is taken before the pressure pulse reaches the pressure sensor after opening of a cylinder exhaust valve and a second of said at least two sampling pressure values is taken at a peak of the pulse.

* * * * *